April 21, 1959     O. I. THOMPSON     2,882,618
EDUCATIONAL DEVICE FOR TRAINING ELECTRONIC TECHNICIANS
Filed May 9, 1955     2 Sheets-Sheet 1

Inventor
Orville I. Thompson
By Alois O. Graf, Attorney

April 21, 1959     O. I. THOMPSON     2,882,618
EDUCATIONAL DEVICE FOR TRAINING ELECTRONIC TECHNICIANS
Filed May 9, 1955     2 Sheets-Sheet 2

Inventor
Orville I. Thompson
By [signature] attorney.

United States Patent Office 2,882,618
Patented Apr. 21, 1959

2,882,618

EDUCATIONAL DEVICE FOR TRAINING ELECTRONIC TECHNICIANS

Orville I. Thompson, Deerfield, Ill., assignor to De Vry Technical Institute, Inc., Chicago, Ill.

Application May 9, 1955, Serial No. 506,748

4 Claims. (Cl. 35—19)

The present invention relates to an educational device, and more particularly to one suitable for training electronic technicians.

In the training of technicians in the electrical and electronic fields, it has been found advisable to familiarize the student with the physical appearance of electrical and electronic components by first using pictorial diagrams which show the components arranged on a chassis or a "bread-board."

In spite of the use of pictorial diagrams, students still make mistakes when attempting to construct equipment by following such diagrams. It therefore is desirable to provide some way to minimize or prevent such mistakes.

After a student has constructed equipment by use of pictorial diagrams, he learns to follow circuit diagrams. At first such circuit diagrams have the symbols of the components in substantially the positions where the components would be located on the chassis or the "bread-board." Subsequently, the student learns to read a circuit diagram without this assistance.

In accordance with the present invention, means are provided for facilitating the progressive education and training of technicians. This is accomplished by the use of a perforated sheet of transparent insulating material having a plurality of components affixed thereto, and a series of diagrams attached to one side of said sheet for progressive instruction of the student. The student will mount all the components shown on the diagram to complete the circuit or equipment. Some components may remain in position from one circuit to the next circuit; but not necessarily so.

It, therefore, is an object of the invention to provide a novel educational device for teaching the fundamentals of electric circuits.

Another object of the invention is to provide an educational device adapted to progressive step-by step teaching of theory, operation and service of electronic, radio and television equipment, and more particularly by correspondence courses.

Still another object of the invention is to provide an improved educational device wherein pictorial and schematic diagrams may be followed, step-by-step, by incorporation of the diagrams into the actual equipment being constructed.

Other and further objects of the invention will become apparent from the following description taken in conjunction with the accompanying drawings, wherein.

Figure 1:
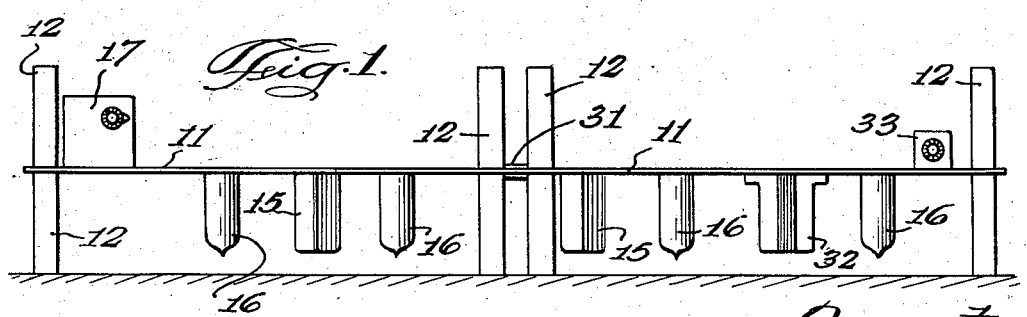
Figure 1 is a side view of the device comprising the invention.

In Figure 1, there is shown a quadrangular transparent sheet of insulating material 11 which is supported by a plurality of supports or legs 12 located preferably adjacent the corners of the sheet. The sheet of material 11 is perforated as may be seen from Figure 2. Rows of small perforations 10 substantially cover the sheet 11. Each of the perforations 10 is of a small diameter approximately ⅛ inch. In addition to the perforations 10, the sheet 11 also has a number of apertures 13 of larger size. The apertures 13 in the sheet 11 are provided to accommodate a plurality of vacuum tube sockets 14 or one or more intermediate frequency transformers 15, or similar components.

It will be noted that the vacuum tube sockets 14 are mounted on the top side of the sheet 11 so that the vacuum tubes 16 depend from the underside of the sheet 11. The intermediate frequency transformers and their casings 15 likewise are positioned so as to depend from the underside of the sheet 11.

Figure 4:
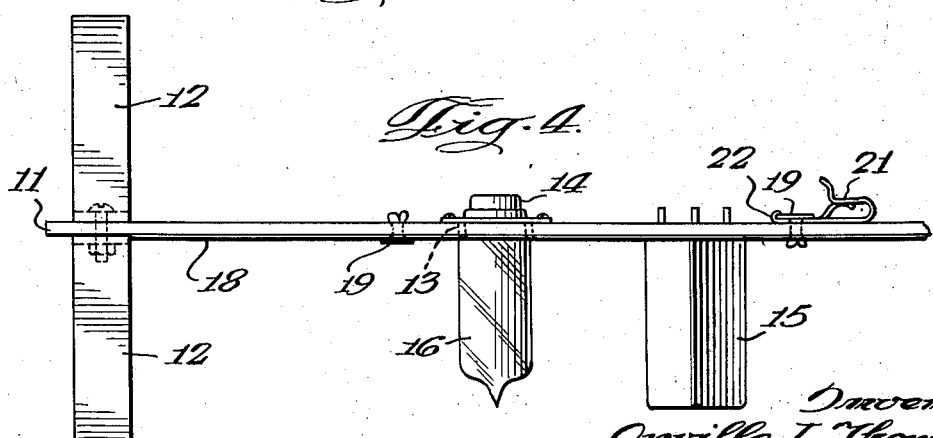
Figure 4 is a detail side view of the device.

To illustrate the features of the present invention, which provide for pregressive instruction of students, Figure 1 shows a sheet 11 having a plurality of vacuum tubes 16 and a single transformer 15 depending from the sheet 11. Mounted above the surface of the sheet 11 is a two-section tuning capacitor 17. From Figure 4 it will be seen that on the underside of the sheet 11 there is provided a pictorial wiring diagram 18 which is also visible in Figure 2. The diagram 18 is retained in position by the use of a plurality of snap-in Trimounts 19 which extend through a number of the performations 10. From Figure 2 it will be noted that the student has partially completed the wiring of the apparatus to the right of the left hand socket 14. To the left of the socket 14, the pictorial guide 18 indicates the locations of the conductors, the various electrical components, and suitable connection members such as the Fahnestock clips 21 which are retained in position by suitable snap-in Trimounts 19 which may be held in position by an overturned edge portion 22 of the Fahnestock clip 21. Quite obviously, the Trimounts 19 will be integrally formed with the clip 21. Thus in Figure 2, for example, the rectangular representations 23 appearing to the left of the socket 14 and the transformer 15 indicate where Fahnestock clips 21 are to be positioned. It will be noted that between the two top parallel arranged rectangles 23 adjacent the left hand socket 14 there is shown a rectangle 24 labeled 22K. 22K is the resistance value of the resistor to be positioned between these two clips. Extending from one of the clips are the conductors attached to a .0001 microfarad capacitor which extends to another clip 23. It will be noted that from the latter clip there is a conductor leading to an inductor 26 which provides the inductance for the oscillator windings of the oscillator section of the oscillator detector to be mounted in the first vacuum tube socket 14. A series padder capacitor 27 is connected between one section of the two-section tuning capacitor 17 and the oscillator coil 26.

To the right of the socket 14, it will be noted that various connections have been made to the sockets 14 and to the transformer 15. These connections include a by-pass capacitor 28 and a resistor 29.

Figure 3:
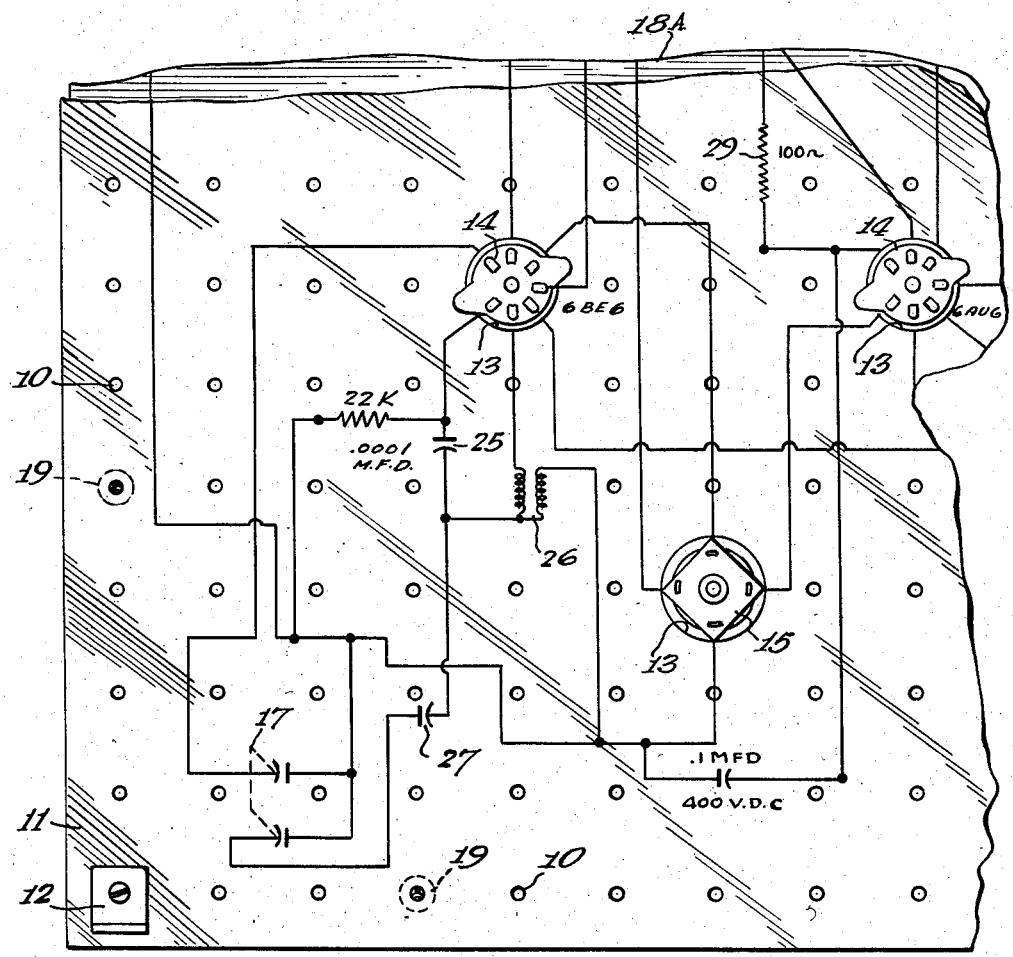
Figure 3 is another partial plan view of the device shown in Figure 1.
Figure 2:
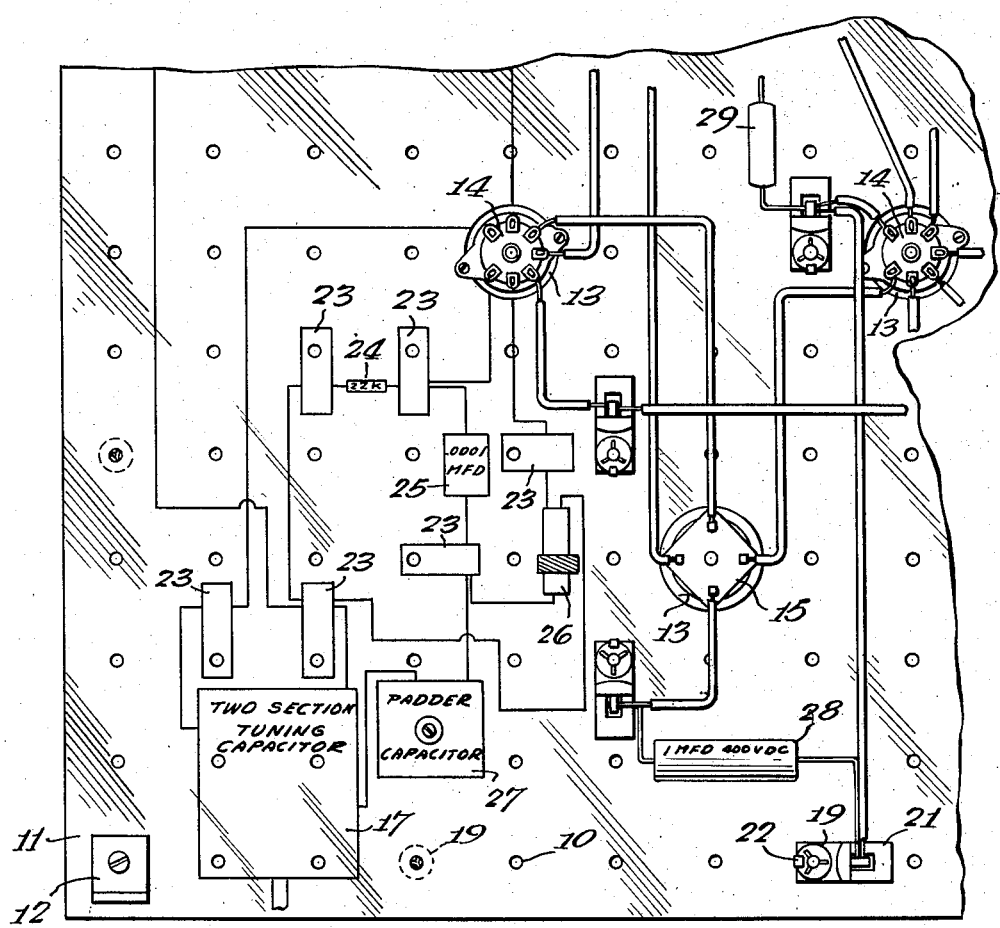
Figure 2 is a partial plan view of the device shown in Figure 1.

In the next stage of instruction, the student is provided with a further sheet 18A which appears as shown in Figure 3. In that diagram it will be noted that the inductance 26 of Figure 2 is diagrammatically represented in Figure 3. It will also be noted that capacitor 25, as well as capacitors 27 and 17, is diagrammatically represented, and that these elements are not necessarily located in the exact positions most conveniently arranged as was the instance with the pictorial diagram shown in connection with Figure 2.

The various sheets 18 attached to the underside of the perforated insulator sheet 11 progressively teach various electrical circuit characteristics from the simple explanation of Ohm's law, to a more complex circuit such as a regenerative single tube detector receiver, and finally to a multistage super-heterodyne receiver as shown in Figure 1. Figure 1 shows two sheets 11 connected together by a connector strip 31. The second sheet 11 carries an audio frequency transformer 32 and on its upper side a bracket 33 carrying a variable resistor or volume control. The sheets 18 are accompanied by suitable instruction manuals and certain forms which are to be filled out by the student. The forms, for example, may require the use of a volt ohmmeter to obtain certain readings, which in turn will show whether or not the student has properly done his homework and has made the proper connections to the components to be assembled into a particular circuit.

While for the purpose of illustrating and describing the present invention particular embodiments have been shown in the drawings, it is to be understood that such embodiments are capable of such modifications as may be commensurate with the spirit and scope of the invention set forth in the accompanying claims.

I claim as my invention:

1. An educational device comprising a thin transparent sheet of electrically insulating material having a plurality of spaced perforations therein and a plurality of spaced openings therein, a tube socket mounted in an opening therein having electric terminals extending therefrom on one side of the sheet, a coil mounted in another opening extending outwardly from the other side of the sheet and having electric terminals disposed on the same side of the sheet as the terminals of the tube socket, a plurality of support brackets mounted to both sides of the sheet and extending outwardly therefrom for mounting the sheet in a horizontal plane with either side up, an instruction chart having indicia indicating the electric connections to be made between the electric terminals and having spaced apertures aligned with the openings of the sheet and adapted to accommodate the tube socket and coil, and releasable fastening means for securing the instruction chart to the side of the sheet opposite the coil and tube socket terminals, whereby electrical connections may be made between the electric terminals and the chart may be mounted to the sheet or removed therefrom without disturbing any electrical connections between the coil and tube socket terminals.

2. An educational device comprising a thin transparent sheet of electrically insulating material having a plurality of spaced perforations therein and a plurality of spaced openings therein, a tube socket mounted in an opening therein having electric terminals extending therefrom on one side of the sheet, a coil mounted in another opening extending outwardly from the other side of the sheet and having terminals disposed on the same side of the sheet as the terminals of the tube socket, a plurality of support brackets mounted on both sides of the sheet and extending outwardly therefrom for mounting the sheet in a horizontal plane with either side up, a series of instruction charts for a plurality of steps of instruction, each chart having indicia indicating the electric connections to be made between the electric terminals for one step of instruction and having spaced apertures aligned with the openings of the sheet and adapted to accommodate the tube socket and coil, and releasable fastening means for securing one of the instruction charts to the side of the sheet opposite the coil and tube socket terminals, whereby electrical connections may be made between the electric terminals and any chart may be mounted to the sheet or removed therefrom without disturbing any electrical connections between the coil and tube socket terminals.

3. An educational device comprising the elements of claim 1 in combination with a plurality of electrical clips mounted on the same side of the sheet as the electric terminals of the tube socket by removable snap-in fasteners projecting into said perforations for receiving electrical conductors and connections to electric components.

4. An educational device comprising a thin transparent sheet of electrically insulating material having a plurality of spaced perforations therein and an opening therein, a tube socket mounted in the opening having electric terminals extending therefrom on one side of the sheet, a plurality of support brackets mounted to both sides of the sheet and extending outwardly therefrom for mounting the sheet in a horizontal plane with either side up, an instruction chart having indicia indicating the electric connections to be made between the electric terminals and having an aperture aligned with the opening of the sheet and adapted to accommodate the tube socket, releasable fastening means for securing the instruction chart to the side of the sheet opposite the tube socket terminals, and a plurality of electrical clips mounted on the same side of the sheet as the electric terminals of the tube socket by removable snap-in fasteners projecting into the perforations for receiving electrical conductors and connections to electric components, whereby electrical connections may be made between the electric terminals and the clips and the chart may be mounted to the sheet or removed therefrom without disturbing any electrical connections.

References Cited in the file of this patent

UNITED STATES PATENTS

| | | |
|---|---|---|
| 1,545,921 | Paul | July 14, 1925 |
| 1,968,039 | Hornberger | July 31, 1934 |
| 2,390,706 | Hearon | Dec. 11, 1945 |
| 2,592,552 | De Florez et al. | Apr. 15, 1952 |
| 2,603,884 | Tucker | July 22, 1952 |

OTHER REFERENCES

Review of Scientific Instruments, page XII, November 1948.